(12) United States Patent
Lambert et al.

(10) Patent No.: US 8,545,605 B2
(45) Date of Patent: Oct. 1, 2013

(54) SQUARE FILTER BAG AND CAGE DESIGN

(75) Inventors: Michael T. Lambert, Maryville, TN (US); Frank J. Licavoli, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 115 days.

(21) Appl. No.: 12/886,982

(22) Filed: Sep. 21, 2010

(65) Prior Publication Data
US 2011/0067570 A1    Mar. 24, 2011

Related U.S. Application Data

(60) Provisional application No. 61/244,660, filed on Sep. 22, 2009.

(51) Int. Cl.
*B01D 46/00* (2006.01)

(52) U.S. Cl.
USPC ............... 95/280; 55/302; 55/341.1; 55/379; 55/492; 95/286

(58) Field of Classification Search
USPC ..... 55/341.1–341.7, 302, 361–382, 490–519; 95/273–287; 96/424–429; 210/172.4, 348–510.1
See application file for complete search history.

(56) References Cited

U.S. PATENT DOCUMENTS 2,774,443 A * 12/1956 Slayter ............................. 55/379
3,830,042 A * 8/1974 MacDonnell ................. 55/341.4
3,844,749 A * 10/1974 Carter, Sr. ..................... 55/341.4
3,853,509 A * 12/1974 Leliaert ......................... 55/341.1
4,336,035 A    6/1982 Evenstad et al.
4,874,400 A   10/1989 Jury
5,074,896 A * 12/1991 Baert et al. .................... 55/341.6
5,800,580 A *  9/1998 Feldt .............................. 55/378
6,740,142 B2 *  5/2004 Buettner et al. ................ 95/273
6,905,529 B2 *  6/2005 Pipkorn et al. ................. 55/379
2003/0177744 A1 * 9/2003 Gerakios et al. ............... 55/378
2004/0237483 A1 * 12/2004 Clements ..................... 55/341.1
2005/0183404 A1 *  8/2005 Pipkorn et al. ................. 55/379

FOREIGN PATENT DOCUMENTS
EP    0 168 369    1/1986

* cited by examiner

*Primary Examiner* — Duane Smith
*Assistant Examiner* — Thomas McKenzie
(74) *Attorney, Agent, or Firm* — Rita D. Vacca (57) ABSTRACT

A fabric filter bag (50) and cage (10) system for use in a bag house (66) for industrial process gas stream particulate removal. The bag house (66) includes an inlet (68) for process gas flow into an interior space (65) thereof, at least one fabric filter bag (50) and cage (10) system within the interior space (65) for filtering the process gas as it flows therethrough, and an outlet (70) for flow of cleaned process gas out of the interior space (65) of the system. The subject fabric filter bag (50) and cage (10) system provides about an additional 14% filter material per bag as compared to like sized round filter bags, thereby effectively reducing the size of bag house (66) required to achieve a particular air to cloth (A/C) ratio. Reducing the size of the bag house (66) required to achieve a particular A/C ratio significantly reduces capital costs typically associated therewith.

19 Claims, 10 Drawing Sheets

SQUARE FILTER BAG AND CAGE DESIGN

The present utility patent application claims priority to co-pending U.S. Provisional Application No. 61/244,660 filed on Sep. 22, 2009.

FIELD OF THE INVENTION

The present invention relates to a fabric filter bag and cage system for use in a bag house for industrial process gas stream particulate removal. The bag house comprises an inlet for process gas flow into an interior space thereof, at least one fabric filter bag and cage system within the interior space for filtering out particulate matter from the process gas as it flows therethrough, and an outlet for flow of cleaned process gas out of the interior space of the bag house. The subject fabric filter bag and cage system provides about an additional 14% filter material per bag as compared to round like sized filter bags, thereby effectively reducing the size of bag house required to achieve a particular air to cloth (A/C) ratio. Reducing the size of the bag house required to achieve a particular A/C ratio significantly reduces capital costs typically associated therewith.

BACKGROUND OF THE INVENTION

Fabric filters are used in many industries to remove particulates from industrial process gas streams, such as for example, from flue gas produced by an industrial power generation plant. EP 168369 and U.S. Pat. No. 4,336,035 describe typical fabric filters useful for cleaning dust-laden gas passed into a housing. In practice, fabric filters are most often in the form of tall, cylindrical or "round" textile bags, placed around tall, cylindrical wire cages of substantially similar dimensions. The wire cages maintain the cylindrical shape of the textile bags when the textile bags are arranged around the wire cages. A number of fabric filters are used simultaneously for particulate filtering in what is typically referred to as a "bag house". Raw, process gas flows into the bag house and through the textile bag leaving dust and particulates on the exterior surface of the textile bag. By intermittent high pressure air pulsing, the textile bag is expanded or "inflated" and then relieved or "deflated" in rapid succession to thereby remove the cake or film of dust and particulates from the exterior surface of the textile bag. The dust and particulates are collected at the bottom of the bag house. While such current fabric filters are effective for removing dust and particulates from process gases, room remains for increased particulate removal efficiency.

SUMMARY OF THE INVENTION

The object of the present invention is to provide a fabric filter bag and cage system that provides about an additional 14% filter material per bag as compared to like sized round filter bags, thereby effectively reducing the size of bag house required to achieve a particular air to cloth (A/C) ratio. Reducing the size of the bag house required to achieve a particular A/C ratio significantly reduces capital costs typically associated therewith.

According to the invention, this object is achieved by a fabric filter bag and cage system for a bag house dimensioned to provide about an additional 14% filter material per bag as compared to like sized round filter bags, thereby effectively reducing the size of bag house required to achieve a particular A/C ratio. Reducing the size of the bag house required to achieve a particular A/C ratio significantly reduces capital costs typically associated with the construction and maintenance thereof. A cage portion of the subject fabric filter bag and cage system is of steel construction, or alternatively may be constructed from a material of suitable strength, durability and physical characteristics for the intended purpose. A cage portion may be formed from one or a combination of two or more cage sections. A cage section is constructed so that when viewed from an end thereof, the periphery of the end, or alternatively a cross section taken perpendicular to the longitudinal expanse of the cage section, is essentially in the shape of a square with inset or rounded corners. Each of the four elongated sides of the cage section is defined by three substantially parallel elongated side wires sized the full length of the cage section. Each of the four corners of the cage section is defined by one elongated corner wire, also sized the full length of the cage section, positioned parallel to and between the side wires. Each of the corner wires is also positioned with an inset, i.e., positioned a distance inward, toward the center of the cage portion, from the points of intersection of the side planes within which the side wires are positioned. Hence, each corner wire is inset from the vertices "V" of the square. As such, the periphery of the cage portion is in the shape of a square with "rounded" corners to reduce corner wear on the textile bag used in combination therewith.

The relatively shorter elongated cage sections may be delivered to a bag house with relative ease due to the reduced overall length thereof. At the site of the bag house, two or more cage sections may be combined or assembled end to end to form a relatively longer cage portion of a desired overall length. Such assembly may be accomplished inside the interior of the bag house, or outside the interior of the bag house and then moved inside the interior of the bag house, whichever is preferred. Assembling cage sections into cage portions is accomplished through the use of interlocking support members described in full detail below.

One or more cage portions of the present disclosure are then positioned in a specific uniquely spaced arrangement within the bag house for process gas flow distribution throughout the interior area of the bag house. Achieving such a specific uniquely spaced arrangement is efficiently accomplished through the use of a support sheet. Like the cages, the support sheet may be fabricated from steel or any other construction material suitable for the intended purpose. The support sheet is a planar sheet of material with multiple apertures formed therethrough. The apertures are dimensioned to securely support an attachment end of a cage section/portion and filter bag. The apertures are intermittently spaced through the support sheet in a specific spaced arrangement to position the cage sections/portions in the desired arrangement to achieve a relatively evenly distributed process gas flow therethrough. Connectors are used with the support sheet for securely removably attaching an attachment end of an individual cage section/portion and filter bag to each aperture in the support sheet. The filter bags attached to the support sheet with the cage sections/portions are essentially long tube-like textile bags dimensioned similarly to that of the cage sections/portions, i.e., a square with inset corners cross section. Prior to attaching the cage sections/portions to the support sheet, a filter bag is placed over the exterior of each cage section/portion with an open end of the textile bag secured at the support sheet and an opposed closed end of the textile bag covering a free end of the cage section/portion, opposite that of the attachment end of the cage section/portion. The dimensions and arrangement of the subject fabric filter and cage system as disclosed provides about an additional 14% filter material per bag as compared to like sized round filter bags, thereby effectively reducing the size of bag house required to achieve a particular desired A/C ratio. Reducing the size of the bag house required to achieve a particular desired A/C ratio significantly reduces costs typically associated with the construction and maintenance thereof.

The fabric filter and cage system described above for placement in a bag house of a plant that produces process gases with particulate matter such as ash and the like, may be used by passing process gas from an exterior of a bag house into an interior area of the bag house for contact with exterior surfaces of textile bags. The process gases pass through the textile bags, through the apertures in the support sheet, and out of the bag house. Particulate matter such as ash entrained in the process gases is collected on the exterior surfaces of the textile bags. Periodically, the cake or film of particulate matter, such as ash, is removed from the exterior surfaces of the textile bags to maintain the efficacy of the filter system.

This and other objects and features are attained by equipment, and a process of using the equipment of the subject disclosure, which provides about an additional 14% filter material per bag as compared to like sized round filter bags, thereby effectively reducing the size of bag house required to achieve a particular A/C ratio. Reducing the size of the bag house required to achieve a particular A/C ratio significantly reduces capital costs typically associated therewith. Additional advantages and features of the subject fabric filter and cage system and arrangement will be evident from the following detailed description and appended claims.

DETAILED DESCRIPTION

Embodiments disclosed herein are presented for purposes of illustration only and are not intended to be limiting in any manner.

Figure 1:
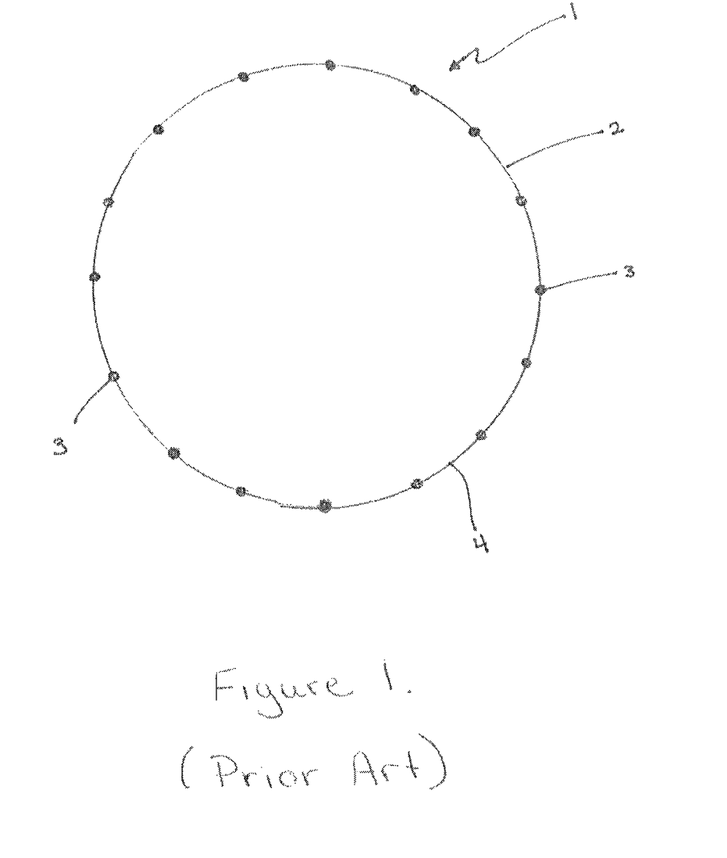
FIG. 1 is an end view of a prior art cage section.

Referring to FIG. 1, an end view of a prior art cage section 1 is illustrated. The periphery 2 of cage section 1 is circular formed by sixteen evenly spaced wires 3 supported by support members 4. The body portions (not shown) of wires 3 are substantially parallel throughout the length (not shown) of cage section 1.

Figure 2:
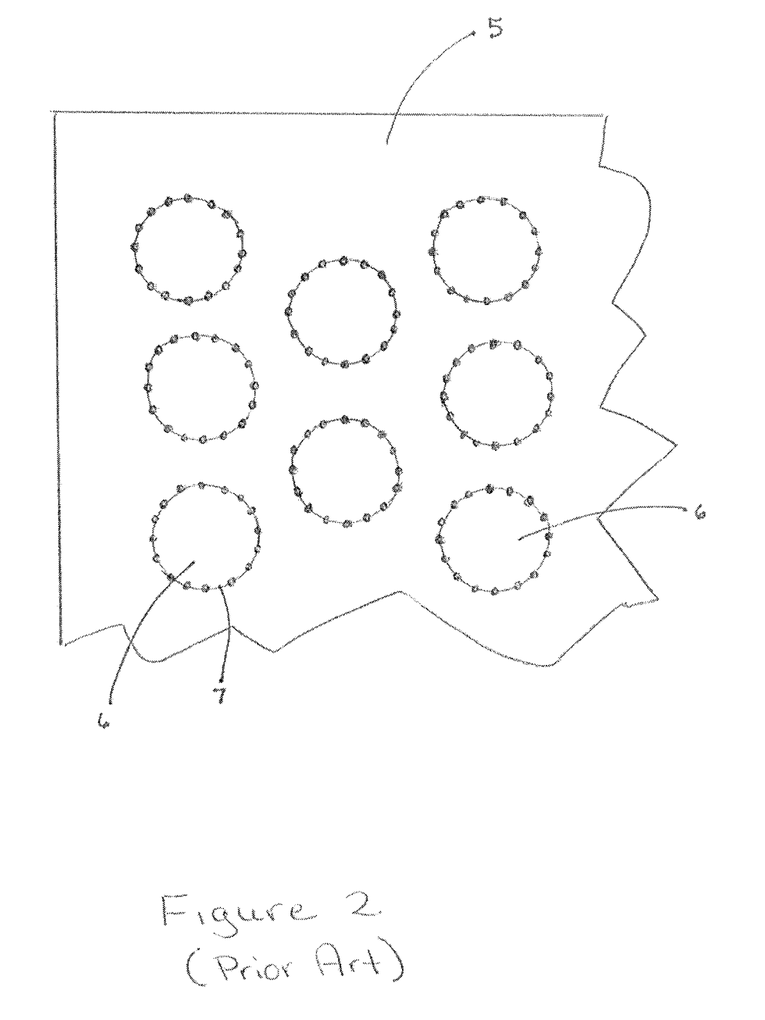
FIG. 2 is a bottom view of a prior art support sheet with prior art cage sections attached thereto.

Referring to FIG. 2, a bottom view of a prior art support sheet 5 is illustrated. The support sheet 5 has a plurality of circular apertures 6 therethrough, each having a circumference sized for connection with an end 7 of the prior art cage section 1 of FIG. 1. Typically, prior art filter bags (not shown) used in combination with the prior art cage sections 1 illustrated in FIG. 1, have an elongated tubular body portion with one open end and an opposed closed end. The open end and tubular body portion are sized for placement over the exterior of one, or two or more combined, cage sections 1. The open end of the textile filter bag is then removably secured to the support sheet 5. The cage 1 serves to support and maintain the filter bag in an "open" or expanded position. Without the cage 1, the filter bag would be unsupported, unexpanded and allowed to freely collapse on its self.

Figure 3:
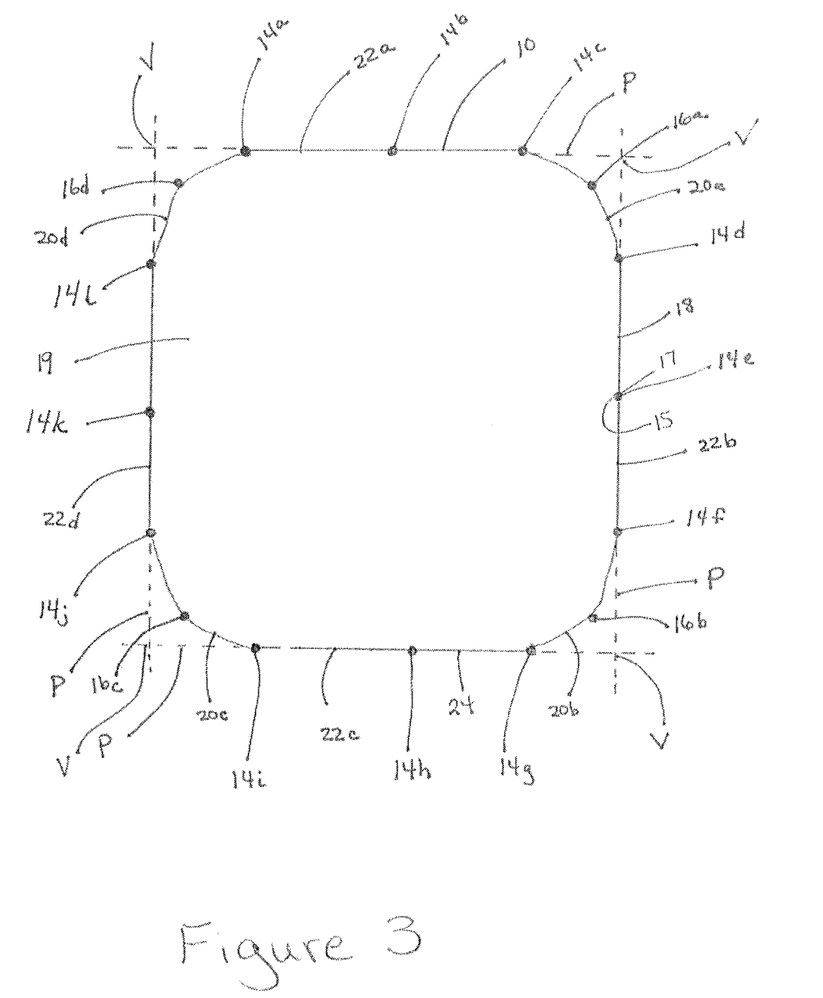
FIG. 3 is an end view of a cage section in accordance with the subject disclosure.

Now referring to FIG. 3, an end view of a cage section 10 in accordance with the subject disclosure is illustrated. The periphery 18 of cage section 10 is essentially square in shape with inset or rounded corners 20a-d. Each side wall 22a-d, comprises three parallel side wires 14a-c, 14d-f, 14g-i and 14j-l. Each set of three parallel side wires 14a-c, 14d-f, 14g-i and 14j-l are positioned in a respective side plane "P" to form respective side walls 22a-d. Each set of three parallel side wires 14a-c, 14d-f, 14g-i and 14j-l are made of two edge wires 14a and 14c, 14d and 14f, 14g and 14i, and 14j and 14l, and one center wire 14b, 14e, 14h and 14k. Each of the three side wires 14a-l, comprising each set of three side wires 14a-c, 14d-f, 14g-i and 14j-l, is evenly spaced apart from one another by about 0.75 inches to about 1.50 inches, or by about one inch. Inset corners 20a-d are formed between two edge wires 14c and 14d, 14f and 14g, 14i and 14j, and 14l and 14a respectively, of two differing side walls 22a-d. Side walls 22a-d each are planar and perpendicular, i.e., 90°, with respect to each of the two side walls 22a-d adjacent thereto. Corner wires 16a-d are positioned equidistance between two edge wires 14c and 14d, 14f and 14g, 14i and 14j, and 14l and 14a, of two differing side walls 22a-d. Corner wires 16a-d are positioned slightly inward toward interior 19 of cage section 10 so as to be slightly inset from vertices "V", i.e., the point of intersection between two side planes P. Corner wires 16a-d are positioned with an inset to avoid forming "sharper" or more abrupt corners possibly causing an area of wear for filter bags 50 used in conjunction with cage section 10. Side wires 14a-l and corner wires 16a-d may be of the same or differing diameters as determined based on the required structural rigidity necessary for cage section 10 depending on the intended use thereof. Likewise, side wires 14a-l and corner wires 16a-d may be manufactured to have cross sections, taken perpendicular to their longitudinal expanse, other than circular, such as for example elliptical. Essentially, any cross section suitable for imparting the required rigidity and durability while not causing filter bag 50 areas of wear, may be used. For use to support filter bags 50 in a bag house 66 useful for cleaning process gases, the side wires 14a-l and corner wires 16a-d should be approximately 3.0 mm to approximately 3.5 mm in diameter. Each of side wires 14a-l and each of corner wires 16a-d is maintained in proper alignment and position by attached support members 24, illustrated in both FIG. 3 and FIG. 4. Support members 24 may be attached to interior surface 15, exterior surface 17 or a combination thereof of side wires 14a-l and corner wires 16a-d, thus defining the periphery 18 of cage section 10. Support members 24 are manufactured with rounded features and attached to side wires 14a-l and side wires 16a-d in a manner and position that avoids causing areas of wear on filter bag 50. The periphery 18 of cage section 10 when measuring from one side wall 22a-d to an opposite side wall 22a-d is about 3.5 inches to about 6.5 inches, or about 5 inches wide. When measuring from one corner wire 16a-d to an opposite corner wire 16a-d the distance is about 4 inches to about 8 inches, or about 6 inches wide. Preferably, a square filter bag 50 and cage 10 design as disclosed herein is minimally 4⅝-6 inches square.

Figure 4:
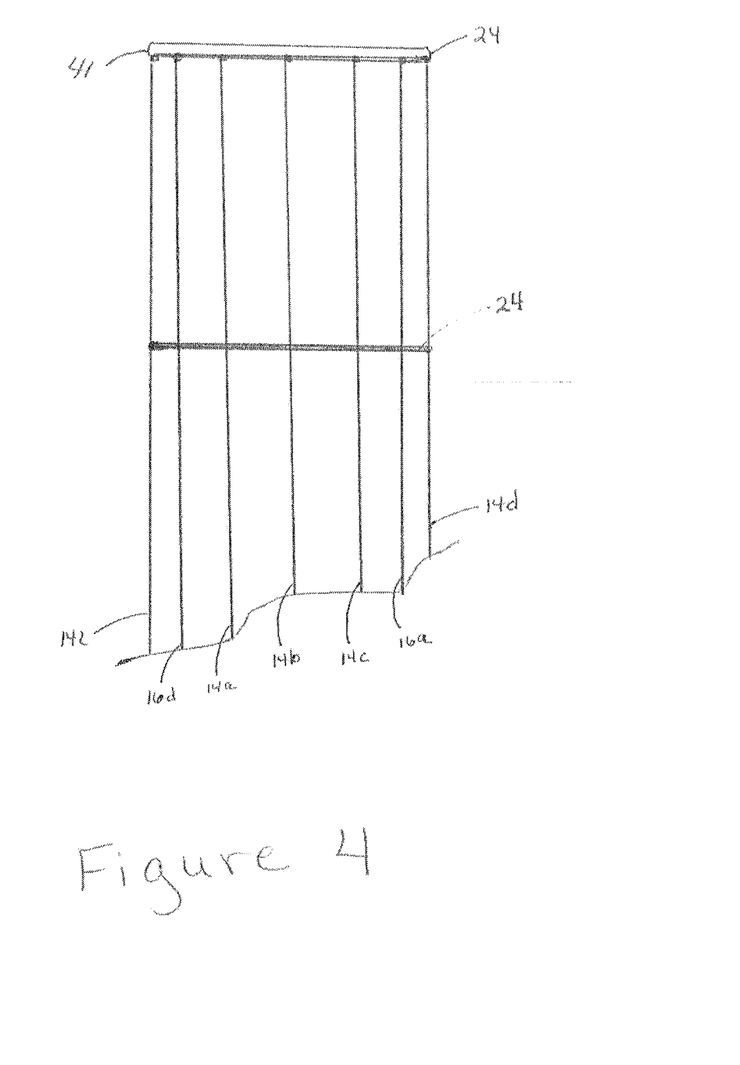
FIG. 4 is a partial side view of the elongated cage section of FIG. 3.
Figure 5:
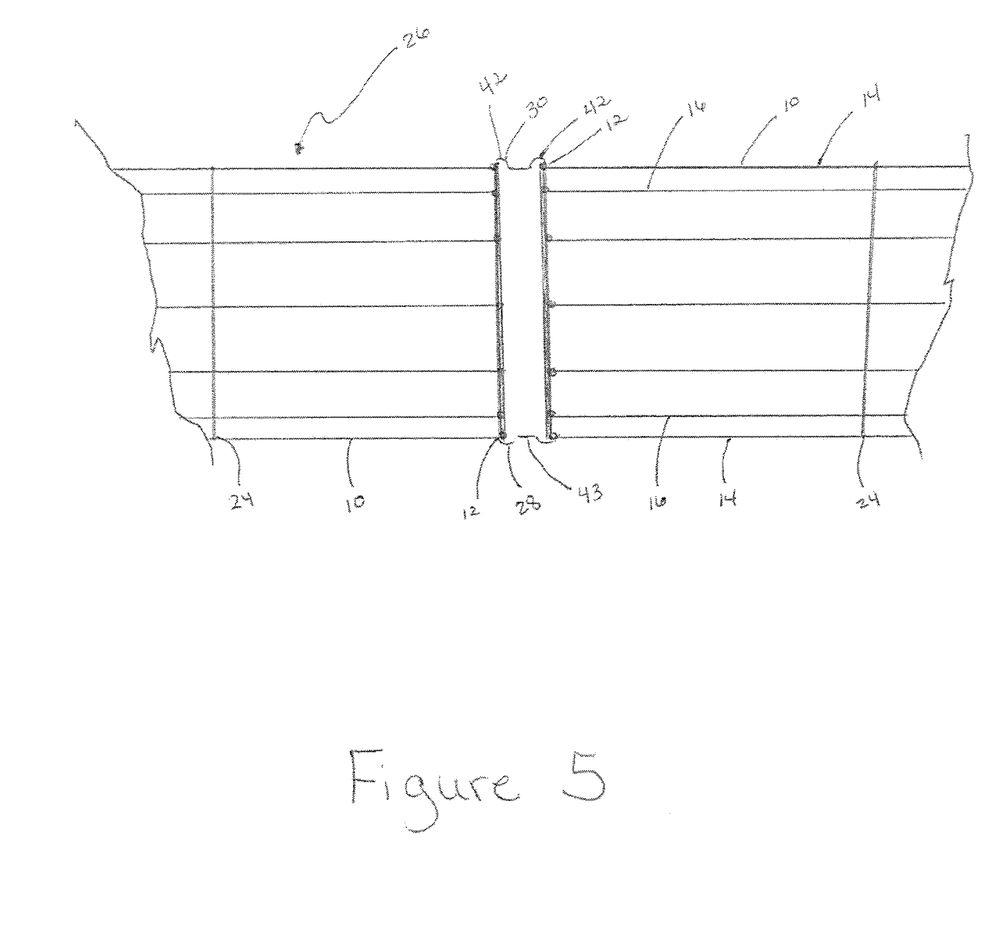
FIG. 5 is a partial side view of an elongated cage portion formed by two elongated cage sections of FIG. 4.
Figure 6:
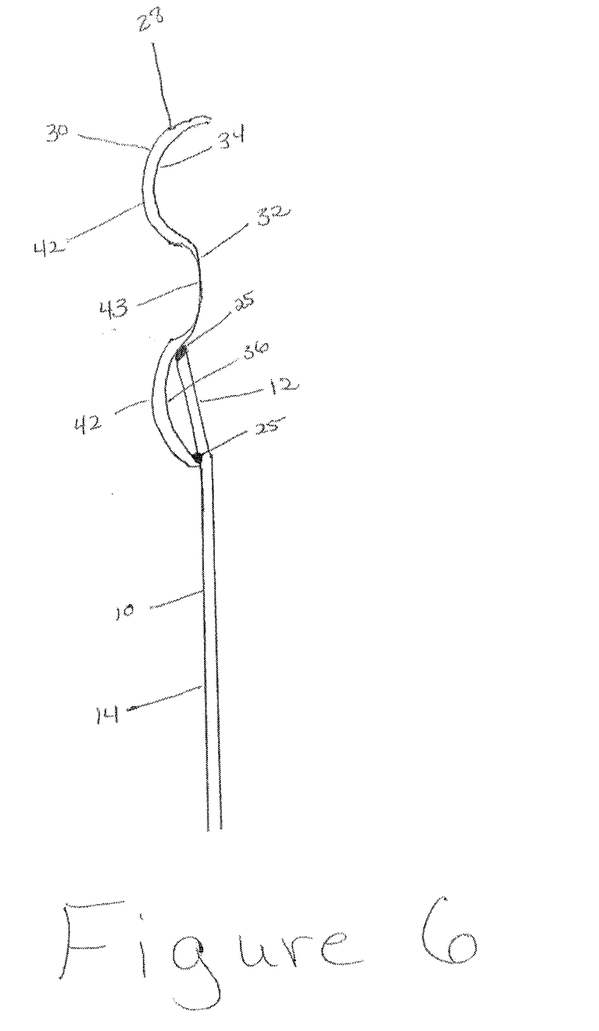
FIG. 6 is an enlarged partial side view of the extended supports of the cage portion of FIG. 5.

Referring to FIG. 5, a partial side view of a cage portion 26 formed by securely joining two cage sections 10 illustrated in FIG. 4. The two cage sections 10 are securely joined together using extended supports 28, best illustrated in FIG. 6. Extended supports 28 are bands with an exterior surface 30 and an interior surface 32. Interior surface 32 includes an upper vault 34 and a lower vault 36. Exterior surface 30 features two ridges 42 opposite vaults 34 and 36, and an indent area 43 therebetween. At least one of each opposed free ends 12 of cage section 10 include an extended support 28. Ridge 41 of support member 24 (FIG. 4) of a first cage section 10 may be positioned within upper vault 34 of extended support 28 of a second cage section 10. According to an alternative embodiment, ridge 42 of extended support 28 of a first cage section 10 may be positioned within upper vault 34 of extended support 28 of a second cage section 10. Ridges 41 and/or 42 positioned within upper vaults 34 fit very snugly for secure interlocking friction fit. Hence, extended support 28 may be used to securely join two or more cage sections 10 to form cage portion 26. However, the subject disclosure is not intended to be limited to the specific embodiments described in detail herein as other means of joining two or more cage sections 10 to form cage portion 26 will become apparent to those skilled in the art based on the embodiments disclosed herein. Extended supports 28 and support members 24 are fixed on free ends 12 by welds 25 or by like means suitable for the intended purpose. Additionally, wires 14 and 16 of free ends 12 may be slightly flared outwardly from interior 19 of cage section 10 for improved fixation with extended supports 28 or support members 24.

Figure 7:
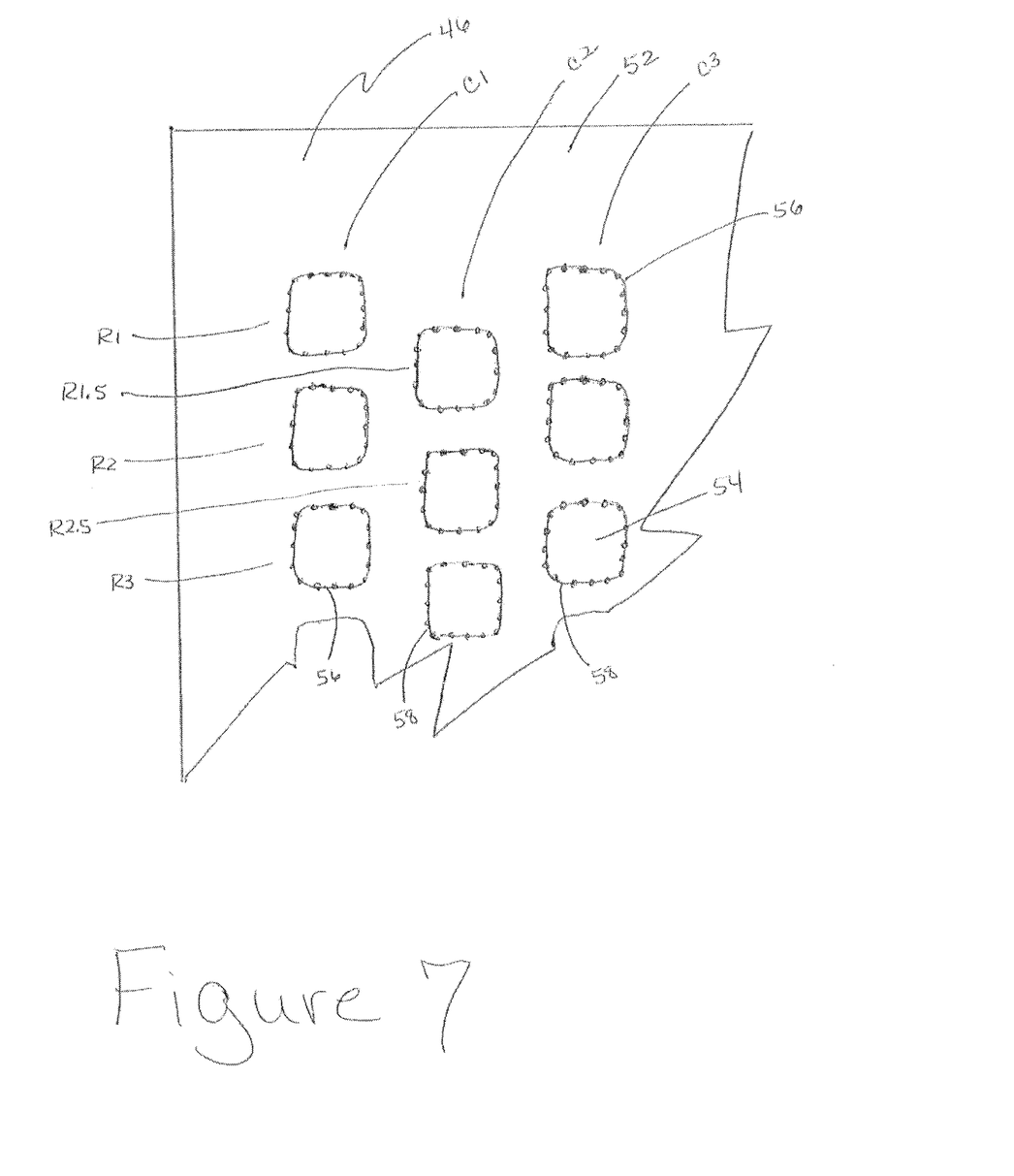
FIG. 7 is a bottom view of a support sheet with cage portions attached thereto in accordance with the subject disclosure.

Illustrated in FIG. 7, is support sheet 46. Support sheet 46 is of planar steel construction. Alternatively, support sheet 46 may be constructed from other suitable materials in accordance with the physical characteristics necessary for the intended purpose. Support sheet 46 includes a top surface 48, an opposed bottom surface 52 and a plurality of apertures 54 extending therethrough. The periphery 58 of each aperture 54 is defined by an interior edge 56. The arrangement of apertures 54 in support sheet 46 are in a specific pattern to achieve a distributed process gas flow throughout a bag house 66 in which the support sheet 46 is installed. Specifically, apertures 54 are arranged in columns and alternating offset rows. As such, apertures 54 in odd columns, e.g., C1, C3, C5, etc., are aligned in rows, R1, R2, R3, etc. Apertures 54 in even columns, e.g., C2, C4, C6, etc., are aligned in off set rows, e.g., R1.5, R2.5, R3.5, etc. Accordingly, an aperture in column 2 is centered an equidistance between the bordering four apertures in columns 1 and 3. The subject arrangement for alternating offset rows serves to disperse the flow of process gas. Dispersal of process gas improves process gas cleaning by causing process gas contact with more surfaces of more filter bags 50 thus improving cleaning efficiency. Process gas dispersal also allows for fewer filter bag 50 cleaning cycles as the particulates collected are more evenly distributed over a larger area of filter bag 50 surfaces rather than collecting on only a few key filter bag 50 surfaces.

Figure 8:
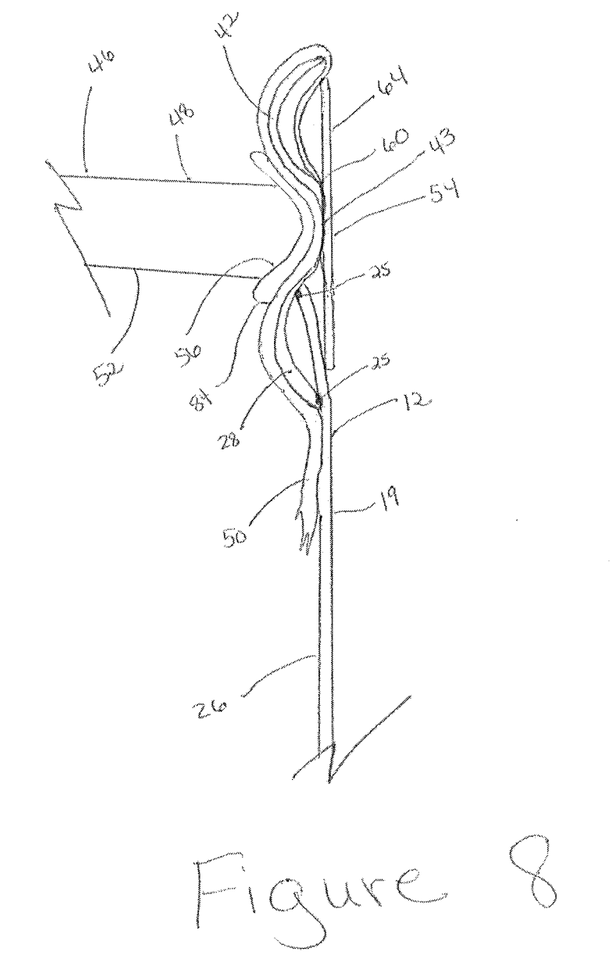
FIG. 8 is an enlarged partial cross section view of the cage portion with extended supports of FIG. 6 and a filter bag attached to the support sheet of FIG. 7.

Illustrated in FIG. 8, is a free end 12 of cage portion 26. Free end 12 is equipped with extended support 28. According to the present embodiment, textile filter bag 50 is positioned to envelop cage portion 26. Free edge 60 of textile filter bag 50 extends beyond free end 12 of cage portion 26 and is folded over free end 12 so as to extend a distance within interior 19 of cage portion 26. Free end 12 of cage portion 26 is then positioned within aperture 54 so that interior edge 56 abuts textile filter bag 50 just below ridge 42 in indent area 43 of extended support 28. Optionally, a gasket 84 may be used in indent area 43 to further seal the connection of cage portion 26 within aperture 54. As such, ridge 42 of extended support 28 is positioned adjacent top surface 48 of support sheet 46, or optionally gasket 84, with textile filter bag 50 therebetween. Within interior 19 of cage portion 26, in contact with free edge 60 of textile filter bag 50 is snap band 64. Snap band 64 is sized and fabricated for secure positioning within free end 12 of cage portion 26 to support cage portion 26 abutment against interior edge 56 of aperture 54 and to secure free edge 60 of textile filter bag 50 within interior 19 of cage portion 26.

Figure 9:
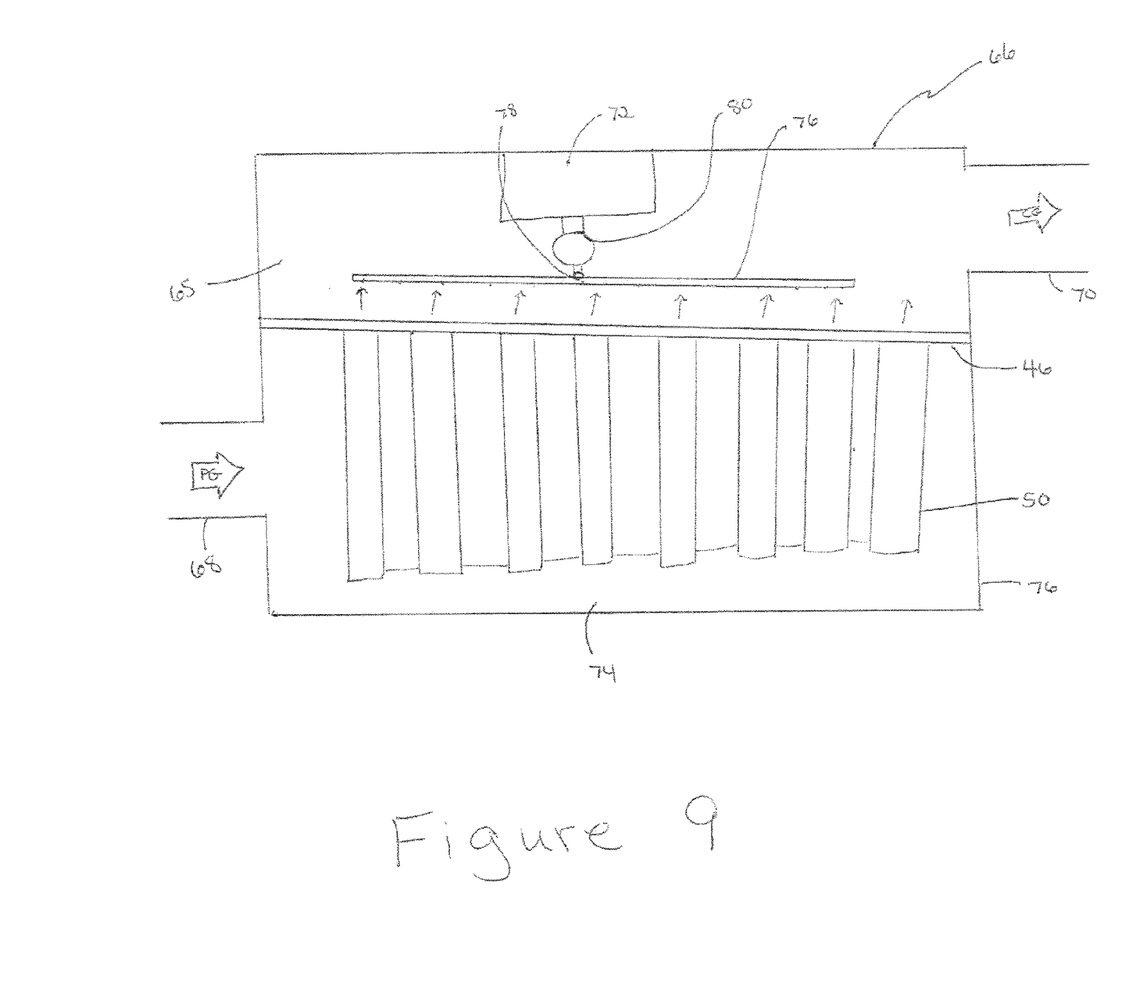
FIG. 9 is a cross section side view of a bag house equipped with the support sheet, cage portions (not shown) and filter bags of FIG. 8.

Illustrated in FIG. 9, is a bag house 66. Bag house 66 with an interior area 65 equipped with an inlet duct 68, a horizontally arranged support sheet 46, a plurality of textile filter bags 50 supported by cage portions 26 (not shown) and an outlet duct 70. Bag house 66 is also equipped with a textile filter bag 50 cleaning mechanism 72. Cleaning mechanism 72 may provide compressed air to the bag house 66. To clean the textile filter bags 50 from accumulated process gas particles, compressed air is pulsed into the filter bags 50, temporarily inflating and deflating them in relatively rapid succession. Temporarily inflating/deflating filter bags 50 causes particulate matter attached thereto to fall off into hopper 74 at the bottom 76 of bag house 66, where the particulate matter is collected and removed.

Cleaning mechanism 72 for cleaning filter bags 50, also illustrated in FIG. 9, includes a header 76 with a compressed air supply. Header 76 feeds compressed air to pulse valve 78, which is ordinarily closed. A controller 80 periodically activates the pulse valve 78 to release a pulse or burst of compressed air into filter bags 50, which causes the filter bags 50 to inflate. When controller 80 deactivates pulse valve 78, the flow of compressed air into filter bags 50 stops and the filter bags 50 deflate. The inflation/deflation of filter bags 50 causes particulate matter collected on the filter bag 50 to fall off, thereby cleaning filter bag 50.

A method of using the subject filter bag 50 and cage portions 26 arranged in an interior area 65 of a bag house 66 includes channeling a flow of industrial process gas "PG" with entrained particulates/particulate matter through inlet duct 68 into interior area 65 of bag house 66. The flow of process gas passes through filter bags 50 and out of interior area 65 of bag house 66 via outlet duct 70. Process gas cannot pass through bag house 66 without passing through a filter bag 50. As process gas passes through filter bag 50, at least a portion of the entrained particulates/particulate matter is blocked by filter bag 50 and incapable of passing through. As a result, as process gas passes through filter bag 50, the process gas is "cleaned" of entrained particulates and the cleaned process gas "CG" then flows out of bag house 66 through outlet duct 70. Throughout the process described herein, cage portions 26 serve to support and maintain the filter bags 50 in an "open" or expanded position. Without cage portions 26, filter bags 50 would be unsupported, unexpanded and allowed to freely collapse on themselves.

Figure 10:
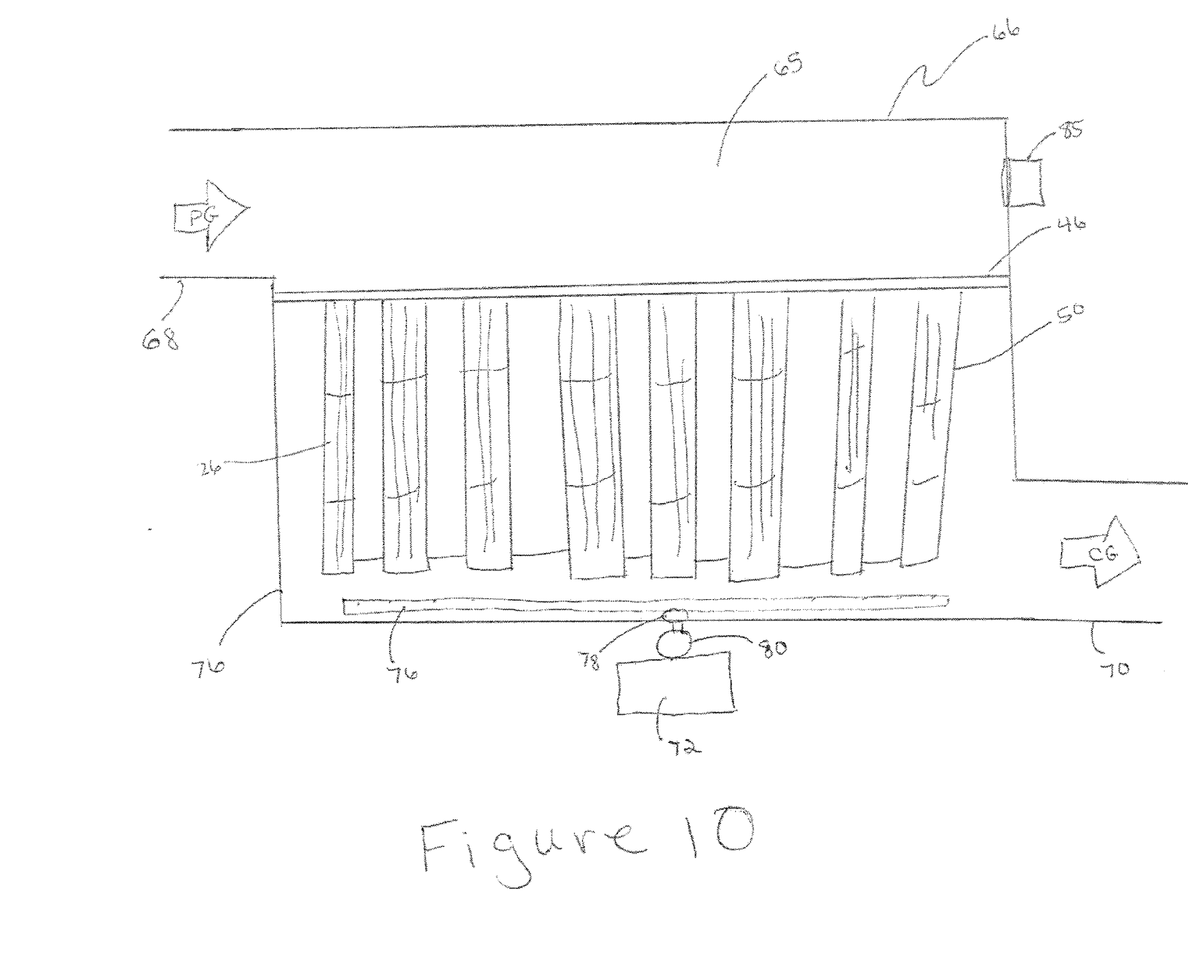
FIG. 10 is a cross section side view of another embodiment of a bag house equipped with a support sheet, cage portions and filter bags according to the present disclosure.

As an alternative embodiment, illustrated in FIG. 10, bag house 66 may be equipped with an inlet duct 68 arranged above support sheet 46 and an outlet duct 70 arranged below support sheet 46. In such an arrangement, filter bags 50 are removably positioned and removably fixed within interior 19 of cage portions 26. Process gas "PG" is channeled into interior area 65 of bag house 66, passed through filter bags 50, and cleaned process gas "CG" flows out of interior area 65 through outlet duct 70. Cleaning mechanism 72 is positioned at the bottom 76 of bag house 66 or alternatively partially outside of bag house 66 to deliver pulsed and/or bursts of compressed air to filter bags 50 to dislodge particulate matter collected therein. The dislodged particulate matter is drawn out of filter bags 50 and interior area 65 through cleaning port 85.

The subject filter bag and cage system as disclosed in detail above provides about an additional 14% filter material per bag as compared to like sized round filter bags, thereby effectively reducing the size of bag house required to achieve a particular NC ratio. Reducing the size of the bag house required to achieve a particular A/C ratio significantly reduces capital costs. Such an increase filter material per bag translates into a significant increase in filtering performance and/or system efficiency. Accomplishing such an increase in efficiency through a filter bag and cage system configuration and arrangement is remarkable since the subject filter bag and cage system configuration and arrangement requires no additional structural support or increases in capital expenditures associated therewith. To the contrary, the subject filter bag and cage system configuration and arrangement allows for a reduction in overall bag house size in order to achieve a particular A/C ratio thereby decreasing the capital costs associated with the construction thereof.

The present disclosure is not intended to be limited to the above-described examples and may be varied and altered in different ways within the scope of the appended claims set forth below.

We claim:

1. A filter bag and cage system for removing particulates from industrial process gases comprising:
   an elongated cage of substantially square cross section with four linear sides, each formed by a plurality of substantially parallel elongated side wires, and four inset rounded corners; and
   an elongated filter bag dimensioned for and supported by the cage for industrial process gas flow therethrough, with said filter bag providing a 14% increase in filter material per bag as compared to a round bag of like width.

2. The filter bag and cage system of claim 1, wherein said inset rounded corners reduce filter bag wear.

3. The filter bag and cage system of claim 1, wherein said cage includes two or more joined cage sections.

4. The filter bag and cage system of claim 1, further comprising:
   a support for securing the filter bag in a similarly dimensioned aperture in a support sheet.

5. The filter bag and cage system of claim 1, further comprising:
   a cleaning mechanism for cleaning particulate matter from a surface of the filter bag using compressed air.

6. The filter bag and cage system of claim 1, further comprising:
   an extended support for removable attachment of the filter bag and cage in a similarly dimensioned aperture in a support sheet.

7. A bag house comprising a plurality of filter bag and cage systems according to claim 1.

8. A bag house comprising a plurality of filter bag and cage systems according to claim 1 removably attached to a plurality of similarly dimensioned apertures in a support sheet, with said apertures spaced in said support sheet to disperse process gas flow.

9. A bag house comprising a plurality of filter bag and cage systems according to claim 1 removably attached to a plurality of similarly dimensioned apertures in a support sheet, and a cleaning mechanism for cleaning particulate matter from a surface of the filter bags using compressed air.

10. A method of using a filter bag and cage system for removing particulates from industrial process gases comprising:
    using an elongated wire cage of substantially square cross section with four linear sides, each formed by a plurality of substantially parallel elongated side wires, and four inset rounded corners in combination with an elongated filter bag dimensioned for and supported by the elongated wire cage to collect particulates from industrial process gases passed therethrough.

11. The method of claim 10, wherein said inset rounded corners reduce filter bag wear.

12. The method of claim 10, wherein said cage includes two or more joined cage sections.

13. The method of claim 10, wherein said filter bag provides about a 14% greater filter material per bag over a circular cross section filter bag of like width.

14. The method of claim 10, wherein a plurality of filter bags and cages are attached to a support sheet in an arrangement to disperse process gas.

15. The method of claim 10, further comprising:
    cleaning said filter bags of collected particulates with compressed air.

16. A method of using a filter bag and cage system for removing particulates from industrial process gases comprising:
    channeling a process gas into a bag house equipped with a plurality of elongated cages each of substantially square cross section with four linear sides, each formed by a plurality of substantially parallel elongated side wires, and four inset rounded corners and a plurality of elongated filter bags dimensioned for and supported by the cages; and
    passing said process gas through said filter bags to collect particulates entrained in the process gas to achieve a cleaned process gas.

17. The method of claim 16, wherein said plurality of cages and plurality of filter bags are supported by a support sheet.

18. The method of claim 16, wherein said plurality of cages and plurality of filter bags are attached to apertures in a support sheet with the apertures arranged on said support sheet to disperse process gas flow.

19. The method of claim 16, further comprising cleaning collected particulates from said filter bags using bursts of compressed air.

* * * * *